United States Patent

[11] 3,570,445

| [72] | Inventor | Richard E. Johnson |
| | | 24 West Broad, Paulsboro, N.J. 08066 |
| [21] | Appl. No. | 802,449 |
| [22] | Filed | Feb. 26, 1969 |
| [45] | Patented | Mar. 16, 1971 |

[54] MAP TRACKER
10 Claims, 7 Drawing Figs.

[52] U.S. Cl.................................................. 116/29,
33/1, 40/42;86;106.45, 116/135, 235/150.27,
340/24, 346/8
[51] Int. Cl............................................. B11g 3/00
[50] Field of Search........................................ 116/28, 29,
35, 36, 56, 114, 135; 340/24, 225; 33/141.5, 1
(M); 40/42, 41, 86, 106.45; 346/8; 123/146.5;
235/150.27, 151.32

[56] References Cited
UNITED STATES PATENTS

| 1,553,194 | 9/1925 | Slowey | 40/86 |
| 1,710,555 | 4/1929 | Tascarella | 33/1 |
| 1,726,563 | 9/1929 | Hokanson | 40/41 |
| 1,741,676 | 12/1929 | Borel | 40/42 |
| 1,572,447 | 2/1926 | Schroeder | 116/29 |
| 1,916,734 | 7/1933 | Logan | 116/29 |
| 2,118,559 | 5/1938 | Hohmann | 40/42 |
| 3,426,431 | 2/1969 | Anderson | 33/141.5X |
| 3,483,506 | 12/1969 | Frisch | 340/24 |

FOREIGN PATENTS

| 1,284,669 | 12/1968 | Germany | 116/124 |

Primary Examiner—Louis J. Capozi
Attorney—Paul Maleson

ABSTRACT: Means to approximately automatically track on a map, the course and position of a vehicle. Motion reducing means connected to the vehicle move a pointer forward at a rate proportional to the speed of the vehicle. The pointer has a degree of freedom for additional motion. A map is positioned beneath the pointer and has a desired route marked with a material to magnetically interact with the pointer so that the pointer always remains in contact with the route and follows it by moving through the additional degree of freedom.

Patented March 16, 1971
3,570,445
2 Sheets-Sheet 1
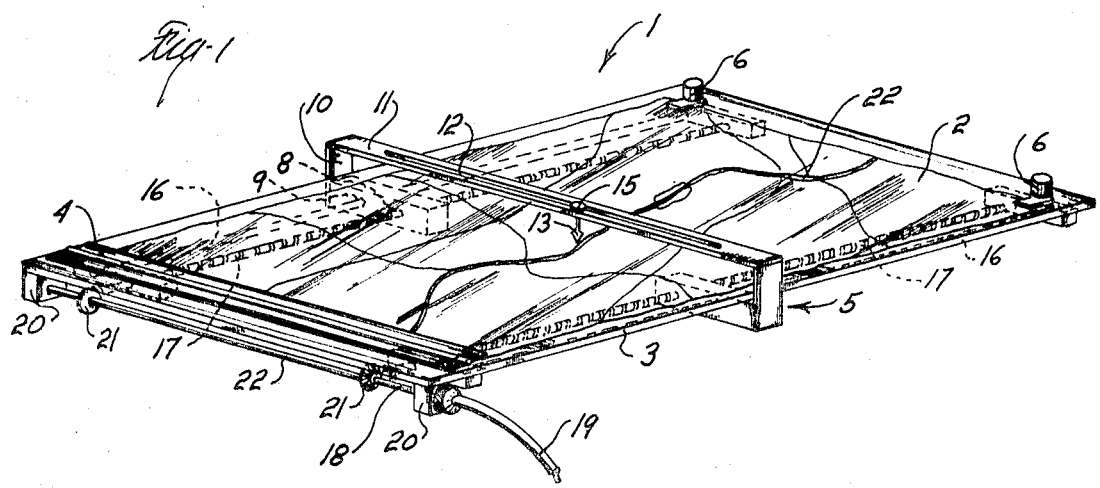
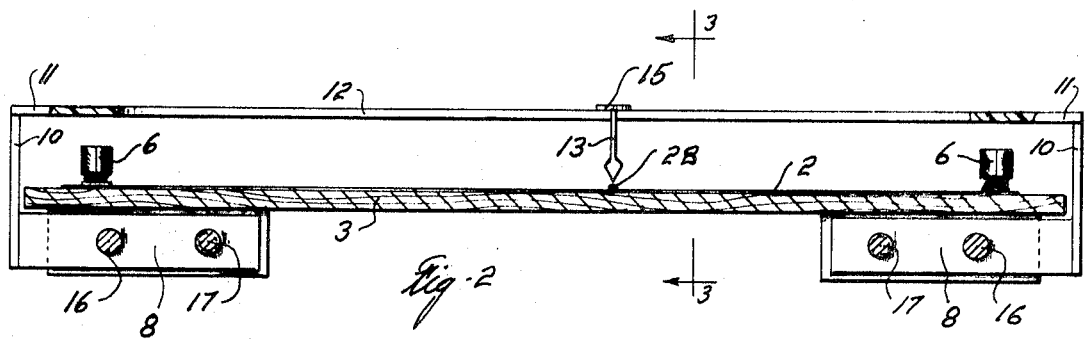
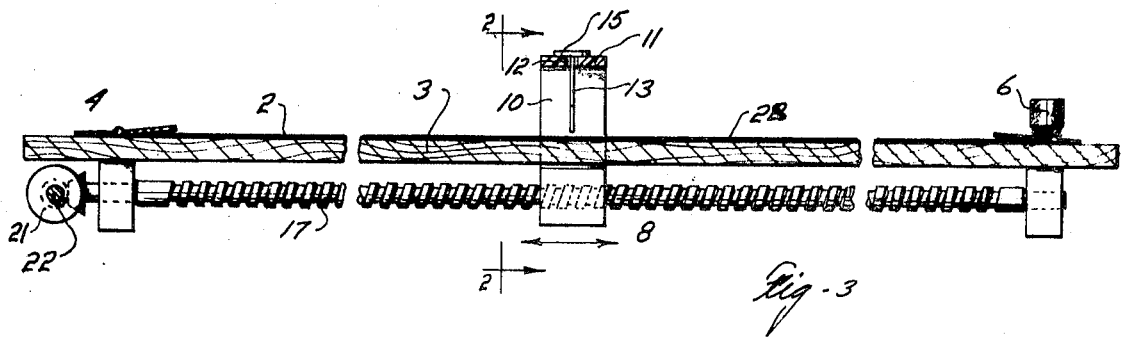
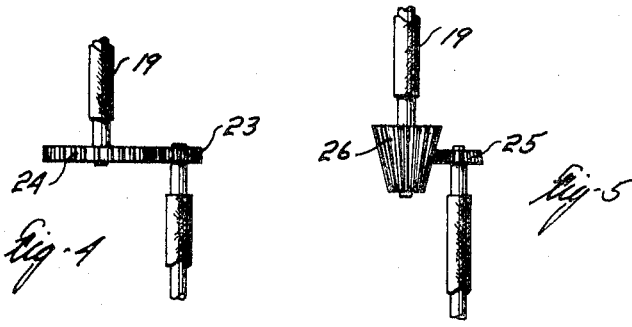
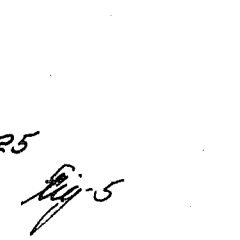
INVENTOR.
RICHARD E. JOHNSON
BY Paul Maleson
ATTORNEY Patented March 16, 1971 3,570,445

INVENTOR.
RICHARD E. JOHNSON
BY
Paul Maleson
ATTORNEY

3,570,445

MAP TRACKER

BACKGROUND OF THE INVENTION

1. Field of the Invention

This invention relates to the art of automatic map tracking. More particularly, it relates to the field of providing a map and having a pointer follow on that map the course being traveled by a vehicle containing the device. This invention is of that type in which a certain degree of accuracy in the tracking is sacrificed in favor of simplicity and economy of construction and operation. It is main field of application, the sacrifice of exact accuracy is acceptable in view of other advantages. The main field of application is in over the road vehicles and more particular it has an important area of utility in use on ordinary touring automobiles in which it can be installed easily. It has even a greater interest to that class of touring motorists who do considerable long distance or turnpike driving.

2. Description of the Prior Art

The prior developments in this general field may be said to fall into two broad categories. One category is of the type that attempts to accurately follow on a map the progress of a vehicle. Such devices have particular applicability to air and seacraft, as well as certain over the country road craft. Such devices use inertial inputs, radio inputs, and other sophisticated sensing means and are of an entirely different order of complexity and expense than the present invention. Such devices are exemplified by U.S. Pat. No. 2,608,094.

The other broad category of map tracker is of the type intended to be used in ordinary land vehicles, obtain its input from the vehicle odometer, and to sacrifice accuracy and automaticity in favor of simplicity. The present invention is considered to be an improvement in this category, in that it adds a substantial measure of accuracy and usefulness in showing the vehicle position on the map, without adding substantially to the complexity of the apparatus. It also has certain advantages to flexibility over prior expedients. Such prior developments in this category are exemplified by U.S. Pat. Nos. 1,077,496; 1,572,447; 1,916,734; 1,726,563; and 1,741,676. In this group, attempts are included to trace exact routes, but these expedients involve sacrifice of flexibility and easy use of different standard maps, and also involve more complex structure less useful and suitable for use as a personal automobile accessory.

SUMMARY OF THE INVENTION

The invention is a map tracker having particular suitability for use in over the road vehicles. It is adapted to receive selected maps, which may be standard available maps, such as those provided by oil companies to travelers, although it can also be advantageously used with specially prepared maps, and maps of the type supplied by certain automobile clubs.

A frame or base is provided to hold the map. The desired route on the map is marked, in one embodiment, by placing thereon a pressure-sensitive adhesive-backed strip of pliable magnetic strip material. A pointer is suspended over the map on a bridge or trolley. The map is preferably positioned under the bridge so that the main direction of the desired route is perpendicular to the main dimension of the bridge. The pointer is free to move along the main dimension of the bridge, and the pointer is magnetic in one embodiment.

The bridge sweeps across the surface of the map by means of a motion-reducing mechanism preferably operated from the vehicle's odometer. Means are provided in one embodiment to selectively change the ratio of motion between the vehicle and the bridge to accord with the scale of the map. The pointer is initially positioned at the starting point on the map and in contact with the magnetic route marker.

An important advantage of this invention over the prior art is that by providing an overall mechanism which is itself simpler than most or all of those disclosed in the prior art, an added degree of accuracy and usefulness of the map is provided in that the pointer follows the exact route. An added advantage of flexibility over the prior art is that this invention permits the desired route to be easily changed and permits the use of many different maps which need not be specially prepared.

It is an object of this invention to provide an automatic map tracker, and other aims and objects of this invention are set forth throughout the specification and claims.

BRIEF DESCRIPTION OF THE DRAWINGS

FIG. 1 is a prospective view taken from above and to one side of the map tracker;

FIG. 2 is an end view thereof showing details of the bridge and its associated structure;

FIG. 3 is a cross-sectional view taken along line 3—3 of FIG. 2;

FIG. 4 is a detailed view of a drive ratio mechanism;

FIG. 5 is a detailed view of an alternate drive ratio mechanism;

DESCRIPTION OF THE PREFERRED EMBODIMENT

The invention is best understood in connection with FIG. 1, which shows the map tracker generally designated 1. It comprises a base 3 which is essentially a flat, rigid, rectangular member. A plurality of clips or clamps 6 are provided at corners to detachably hold a map 2 on to the base. As shown, these clamps 6 are spring loaded.

Figure 7:
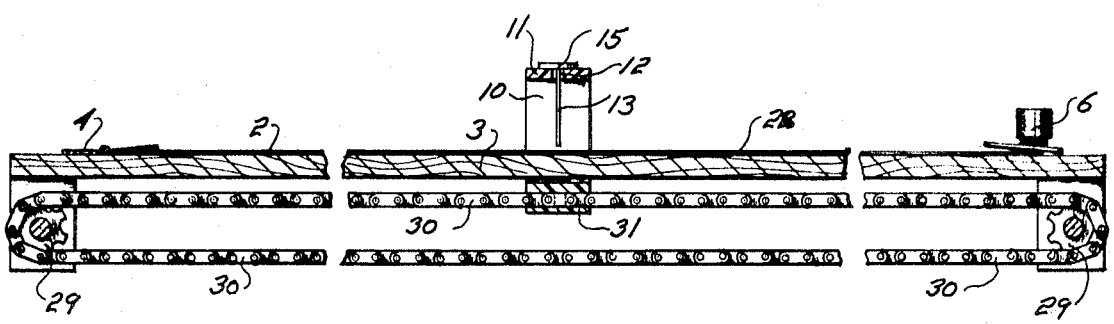
FIG. 7 is a side view, partially in section, showing an alternate form of the drive mechanism in FIG. 3.

As shown in FIGS. 3 and 4, the clamps 6 may be provided at two adjacent corners at one end of the rectangular base 3 and a stationery clip or lip at the other end of the base. Thus, a map 3 can be slipped under the clip at the left hand end, as best shown in FIGS. 3 and 7 and then held down by the clamps 6.

A bridge or trolley, generally designated 5 is provided. This bridge spans the base transverse to the long dimension of the base. The bridge includes a pair of uprights 10, one on each side of the base. A crossbar 11 connects the uprights 10 and spans the base. As best shown in FIG. 1, the cross bar 11 is provided with an elongated slot 12 longitudinal of the main or long dimension of the bridge. The slot 12 extends across substantially the entire width of the map positioned beneath it.

Attached to the bottom of each of the uprights 10, and positioned below the base 3, a pair of support blocks 8 are provided. Each support block 8 is provided with a pair of holes therethrough, longitudinally of the long dimension of the base. In each block 8, one hole has a smooth bore and is a guide hole. It receives a smooth extended guide rod 16. The bridge 5 is free to move along the guide rod 16.

The other hole in each of the support blocks 8 is a drive hole, and is threaded to receive an elongated worm or drive screw 17. It is apparent that the rotation of the drive screw 17 moves the bridge 5 one way or the other along the long dimension of the base. The drive screws 17 are each provided at one end thereof with a bevel gear. Each bevel gear is driven from a bevel drive gear 21. The bevel drive gears 21 are mounted on a transverse drive shaft 22. The drive shaft 22 is in turn given a rotary motion from the rotation of the vehicle odometer cable. The rotation of the odometer cable is altered in translation to the rotation of the drive shaft 22 so that a rotation of the odometer cable corresponding to a unit distance of travel of the vehicle will be reduced to a motion of the bridge of a distance corresponding to that unit distance on the particular map used.

The means to translate these two rotational motions at the desired ratio is shown in FIG. 4. The odometer cable 19 terminates in a spur gear 24. A pinion 23 is provided on the drive shaft. The relationship between the pinion and the spur gear provides the necessary ratio, and usually, this will be a reduction. Either the pinion 23 or the spur gear 24 may be made removable and replaceable with like parts of different diameters so that the ratio is selectively changeable to accommodate maps of different scale and to accommodate different odometer cable revolutions per unit travel distance of the vehicle. Accommodation for change of the gears is easily provided by having some degree of flexibility in the cable 19 and the drive shaft 22 where they come together. The fragmented portion of the covering material shown at the bottom of FIG. 4 may be a flexible hollow tube thus permitting some play and accommodation of different gears. The cable 19 is generally of a flexible nature on automobiles.

FIG. 5 shows an alternate embodiment to that of FIG. 4. An odometer bevel gear 26 is provided at the end of the odometer cable 19. This meshes with a drive shaft bevel gear 25 on the drive shaft 22. One of the bevel gears, bevel gear 26 as shown, is elongated to form a distinct conical shape. Thus, by sliding the gears 25 and 26 axially with relation to each other, a change in the ratio is provided having infinite variability within a chosen range. It is obviously expedient to provide calibration for the differing relative positions of the gears 25 and 26 and to provide, if desired, any type of means to conveniently shift these gears axially. Such shifting actuation means is not in itself the critical aspect of this invention, although the concept of having easily adjustable ratios contributes to the flexibility of the invention. The structure from the threaded hole to receive the drive screw backwards to the odometer cable 19 is together considered a bridge drive means, and the structures shown in FIGS. 4 and 5 is considered the variable ratio means.

A pointer 13 is suspended from the bridge crossbar 11 pointing downwardly through slot 12. It is suspended on the crossbar by retainer 15. The pointer 13 is free to move along slot 12, and it is magnetized. It is apparent that the bridge and hence the pointer 13 moves along the long dimension of base 3 at a speed proportional to the speed of the vehicle.

FIG. 7 discloses an alternate form of part of the drive means. A chain and socket means is provided instead of a worm drive. A link chain 30 is provided underneath the base, corresponding in approximate position and substituting for the drive screw. At each end of the map tracker 1, a sprocket 29 is provided to carry and mesh with the chain 30. One of the sprockets is an idler and the other is connected to a variable ratio means as described above. Each upright 10 of the bridge is connected at the bottom thereof to a support block 31. The support block 31 is affixed to the chain 30 at one point thereon. Thus, the rotation of the odometer cable will rotate the sprocket, move the chain, and hence move the bridge in a manner as described above in connection with the FIG. 3 embodiment.

Figure 6:
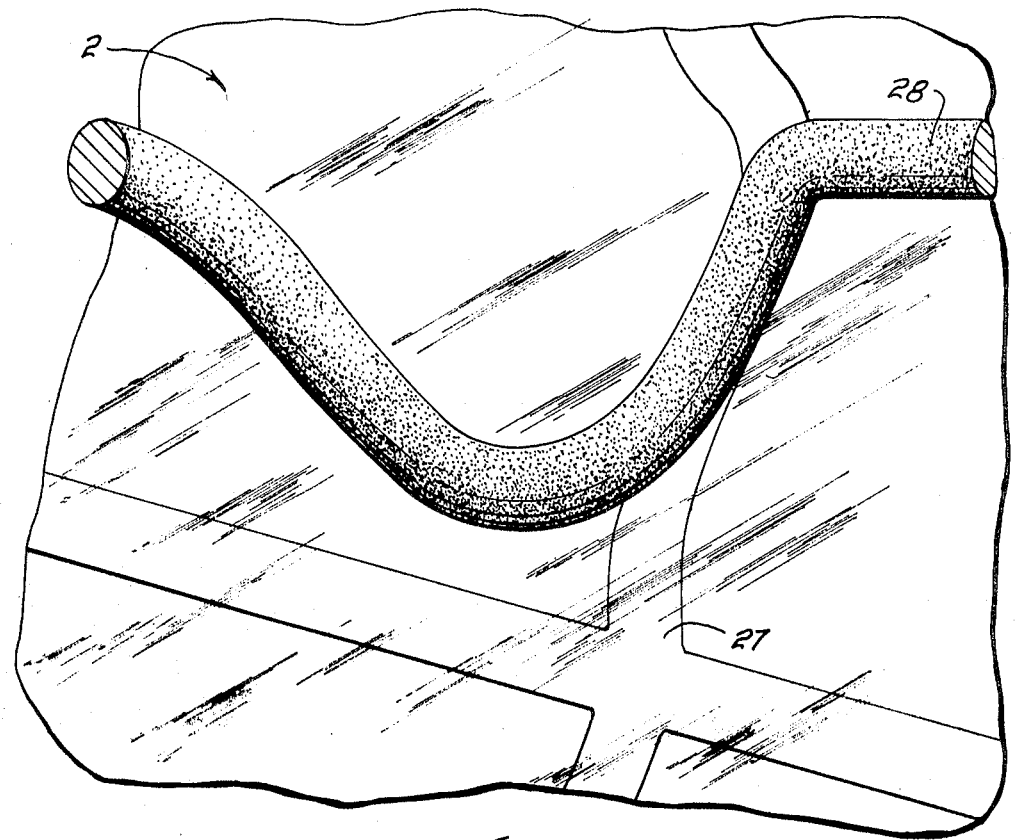
FIG. 6 is an enlarged fragmentary view of a section of the map with the magnetic marker thereon.

FIG. 6 shows in detail the way a chosen map is prepared by the ultimate user by marking the particular route 27 on the map. An elongated strip of pliable magnetic material 28 is provided such magnetic material is well known for use in many arts and is easily available on the market. It is commonly used for example for sealing functions on closures which are intended to latch magnetically. The magnetic strips 28 is coated with a pressure-sensitive adhesive of a type well known in the art.

A preferable way to use the invention is as follows. The bridge 11 is moved by hand to one end of the base 3. The selected map is placed on the base and clipped to it as described above, with the route 27 being arranged as near as possible to be parallel to the long dimension of the base 3 and the direction of motion of the bridge. Preferably, the route is centered as near as may be between the sides of the base, and the starting point of the trip is positioned at the end of the base at which the bridge is initially positioned. A strip of the magnetic material 28, as described, and which may be called the marking strip, is laid down over the map along the chosen route 27. Pressure of the fingers causes the marking strips 28 to adhere to the map surface. FIG. 6 shows the marking strip in the process of being laid down over the route, and FIG. 1 shows a marked route in a suitable position with respect to the bridge and base.

The magnetic pointer 13 is brought into contact with the marking strips 28, or at least is brought as close to is as physically possible, as shown in FIG. 2 where the pointer 13 is directly above the marking strip. As the vehicle moves and the bridge consequently move proportionately, the pointer 13 follows the marking strip and shows the location of the vehicle on the map.

It is important that there be a magnetic coaction between the strip and the pointer. It is preferable that both be magnetized as described, but it is apparent that the device will function, although with less efficiency, if only one of these elements is magnetized, and the other is simply of magnetic material. Thus, it is within the scope of this invention, although not preferred, to have the pointer for example made merely of magnetizable materials such as soft iron.

The marking 28 as shown in FIG. 6 is a circular cross section and is completely coated with an adhesive. This strip is not limited to any particular cross section, and may for example be rectangular, and have the adhesive only on one side.

It is within the scope of this invention to have the pointer 13 magnetized and have the marking strip made of magnetizable material, such as soft iron wire, although this is not preferred, as explained above. A greater magnetic coaction can be obtained by providing pointer 13 as an electromagnet. Thus, pointer 13 as shown would be the electromagnet core which would be wound with current-carrying wires. This structure is of course very well known in the art and is an obvious expedient if a stronger degree of magnetization of the pointer is required. The marking strip 28 can be supplied in rolls to be cut, or the length or lengths of it can simply be adhered to the side of the base for convenient storage.

The bridge can be made to override the drive means so that it can be reset or corrected, in any convenient manner, such as by providing a slip clutch, as a pair of coacting friction wheels. Another obvious expedient is to permit the drive shaft 22 to be manually pulled away from the bevel gears on the drive screws so that the drive screws are free to rotate. Another obvious expedient to accomplish this in connection with the embodiment of FIG. 7 is to permit the support block 31 to be disengaged from the chain 31 by simply lifting the bridge slightly so that it can be moved to another link.

It is apparent that as the desired route departs from the parallel to the bridge travel direction, the cumulative error in the exact position increases as the trip progresses. This shortcoming is true of most other simple map trackers, and in the most favorable field of use, in connection with ordinary personal passenger cars on highways, it can be accepted.

The device is installed in an existing car merely by connecting the odometer cable of the car, or an extension or takeoff of it to the variable ratio means of the invention. The scale of the chosen map can be accommodated by setting the variable ratio means. The utility of the invention is increased by the fact that there are many important sections of roads, particularly those traveled by long-distance drivers, that are essentially nearly straight for significant lengths. In addition to ordinary oil company maps and other highway maps, there are in existence maps in extended longitudinal form containing important highway segments printed nearly parallel to long sides of the maps. It is also of course possible for the driver to correct any accumulated error as he becomes aware of it by observing a landmark, simply by moving the bridge manually.

I claim:

1. A map tracker for connection to a vehicle odometer, comprising:
   a base, means on said base to support a map thereon;
   a bridge spanning said base transversely and being movable longitudinally with respect to said base, said bridge having a slot therein transverse to said base;
   a pointer supported on said bridge and freely movable in said slot;
   drive means to move said bridge longitudinally at a rate proportional to the speed of said vehicle, said drive means being connected to said odometer; and a map on said base below said bridge, said map having a route provided with a marking strip, said marking strip and said pointer being magnetically coacting so that said pointer follows said marked route upon movement of said bridge.

2. A map tracker as set forth in claim 1 wherein a variable ratio means is provided in said drive means to permit selective change of the ratio between the rotation of said odometer and the rate of movement of said bridge.

3. A map tracker as set forth in claim 2 wherein said variable ratio means includes a pair of coacting bevel gears being mutually axially movable to change the gear ratio between said gears.

4. A map tracker as set forth in claim 2 wherein variable ratio means includes a pair of coacting spur gears, at least one of said gears being interchangeable with gears of different effective diameter to change the gear ratio between the gears.

5. A map tracker as set forth in claim 2 wherein said drive means comprises a drive screw extending longitudinally of said base, and said bridge comprises a support block provided with a threaded hole receiving and coacting with said drive screw, said drive screw being connected to and driven by said odometer cable.

6. A map tracker as set forth in claim 2 wherein said drive means comprises a chain extending longitudinally of said base and extending endlessly around sprockets, said bridge being attached to said chain, and at least one of said sprockets being connected to and driven by said odometer cable.

7. A map tracker as set forth in claim 1 wherein said pointer and said marking strip are of magnetic material and said pointer is magnetized.

8. A map tracker as set forth in claim 1 wherein said pointer and said marking strip are of magnetic material and said marking strip is magnetized.

9. A map tracker as set forth in claim 8 wherein said marking strip is an elongated strip of pliable magnetic material at least partially coated with pressure-sensitive adhesive.

10. A map tracker as set forth in claim 1 wherein both said pointer and said marking strip are magnetized.